United States Patent

Windley

[15] 3,683,160
[45] Aug. 8, 1972

[54] METHOD AND APPARATUS FOR MONITORING AND PREDICTING THE LEVEL OF DYEABILITY OF YARN DURING ITS PROCESSING

[72] Inventor: William Thomas Windley, Seaford, Del.

[73] Assignee: E. I. du Pont de Nemours and Company, Wilmington, Del.

[22] Filed: March 24, 1970

[21] Appl. No.: 22,343

[52] U.S. Cl. .....................235/151.13, 264/40, 18/8, 235/151.3
[51] Int. Cl. ..........................G06g 7/14, D01d 5/12
[58] Field of Search.235/151.13, 180, 151.3, 151.31; 28/74, 75, 72.6; 264/40; 18/8 K, 2 HA; 324/71; 8/17

[56] References Cited

UNITED STATES PATENTS

| | | | |
|---|---|---|---|
| 2,278,888 | 4/1942 | Lewis | 18/54 |
| 3,347,960 | 10/1967 | Fenley | 264/40 |
| 3,509,595 | 5/1970 | Mader, Jr. et al. | 264/40 |
| 2,930,102 | 3/1960 | Hitchin et al. | 18/8 K |
| 3,524,221 | 8/1970 | Jones, Jr. | 264/40 |

Primary Examiner—Eugene G. Botz
Assistant Examiner—Edward J. Wise
Attorney—Howard P. West, Jr.

[57] ABSTRACT

A method and apparatus for monitoring the level of potential dyeability of a synthetic yarn while it is being produced in a plurality of steps that utilize electric power. Electric signals proportional to the power utilized in at least two of the steps are generated then fed to a computer which then computes indices of potential dyeability according to either a quadratic or linear polynomial function and generates output signals proportional to these indices. The computer output signals are then compared to preselected limits to determine and indicate the occurrence of out-of-limits dyeability values. In some situations, electric signals related to specific physical parameters other than electric power such as yarn tension, polymer viscosity and temperature may be used to supplement, or supplant the above signals in the computation.

14 Claims, 2 Drawing Figures

METHOD AND APPARATUS FOR MONITORING AND PREDICTING THE LEVEL OF DYEABILITY OF YARN DURING ITS PROCESSING

BACKGROUND OF THE INVENTION

This invention relates generally to the production of yarn by melt spinning synthetic polymers and subsequent processing. Specifically, it relates to the predictive monitoring of the level of potential dyeability of yarn during its processing to a usable end product.

In this context, the term "yarn" is designated to include not only single filaments but combinations of bundles of filaments.

Variations in the potential dyeability of yarn can lead to unsatisfactory end use properties. For example, unacceptable streaks or shade differences may appear in woven fabrics made from yarns having too great a difference in potential dyeability.

In the past, it has been customary to take yarn skein specimens from packages produced at preselected intervals and submit them to a laboratory dye test. Here, the skeins are dyed, dried and measured for dye uptake levels. This type of dye level monitoring is not only time consuming and expensive but also results in deleterious time lag between yarn production and recognition of unacceptable potential dyeability. This delay sometimes leads to production of excessive quantities of unacceptable or off standard yarn that must not be combined with normal yarn in end uses that require dyeing. Furthermore, it has been found that dyeability levels may vary over short periods of time including that time required for producing a single package. In such cases, a skein dyeing of the outer layers of the package would fail to detect the variation in dyeability within the package. In other cases, the conditions causing unacceptable dyeability at one moment may self-correct at a later time so that the skein dye results might predict and therefore result in the segregation of considerably more yarn production than was, in fact, unacceptable. Thus, there has been a need for a real-time predictive monitoring of potential dyeability variations.

It has been found that indices computed from certain combinations of power input levels and/or other parameters of polymer property change for various processing steps correlate closely with dyeability determined by skein dyeings of coordinated specimens of yarn and with end use dyeability such as in woven and knitted fabrics.

SUMMARY OF THE INVENTION

This invention encompasses both a method and apparatus for monitoring and predicting the level of potential dyeability of a synthetic yarn while it is being produced. Such yarn production generally involves a plurality of steps each of which may utilize electric power to modify a yarn physical property that in turn is known to affect the level of potential dyeability of the yarn; this being related to a dyeability index. For the purpose of this invention, the power levels related to physical properties are continuously detected and first signals are generated proportional to the power levels detected in at least two of the steps. Second signals having a value proportional to dyeability index, are generated; these second signals are related to the first signals in accordance with an explicit quadratic polynomial function having first order interaction terms and derived according to the methods of regression analysis disclosed in Methods of Correlation And Regression Analysis, Third Edition by Ezekiel and Fox. The level of potential dyeability is then monitored by detecting when the value of the second signals fall outside predetermined limits.

In the illustrated embodiment, electric power required at various positions in the production apparatus is monitored. Electric signals indicative of the power levels for each point respectively are generated and fed to an analog computer. Indices of potential dyeability are computed from these signals according to an explicit quadratic polynomial equation with first order interaction terms of the form:

$$D = d_o + \sum_{i=1}^{n} d_i x_i + \sum_{i,j=1}^{n} d_{i,j} x_i x_j + \sum_{i=1}^{n} d_{ii} x_i^2$$

where D is the index of potential dyeability for a preselected polymer and dye type; $d_o$, $d_i$, $d_{i,j}$ and $d_{ii}$ are empirically determined constants for this type, some of which may be zero under certain circumstances; and $x_i$, $x_j$ are the signals for the various points respectively. A digital voltmeter converts computer output to dyeability index; a comparator detects occurrence of out-of-limits dyeability values and activates a printer and/or alarm system. A scanner and timer optionally provides for monitoring a given spinning position for different dyeability types; for monitoring in sequence a number of spinning positions; and, through time coordination, for identifying yarn packages with dyeability level at time of determination.

DESCRIPTION OF THE ILLUSTRATED EMBODIMENT

Figure 1:
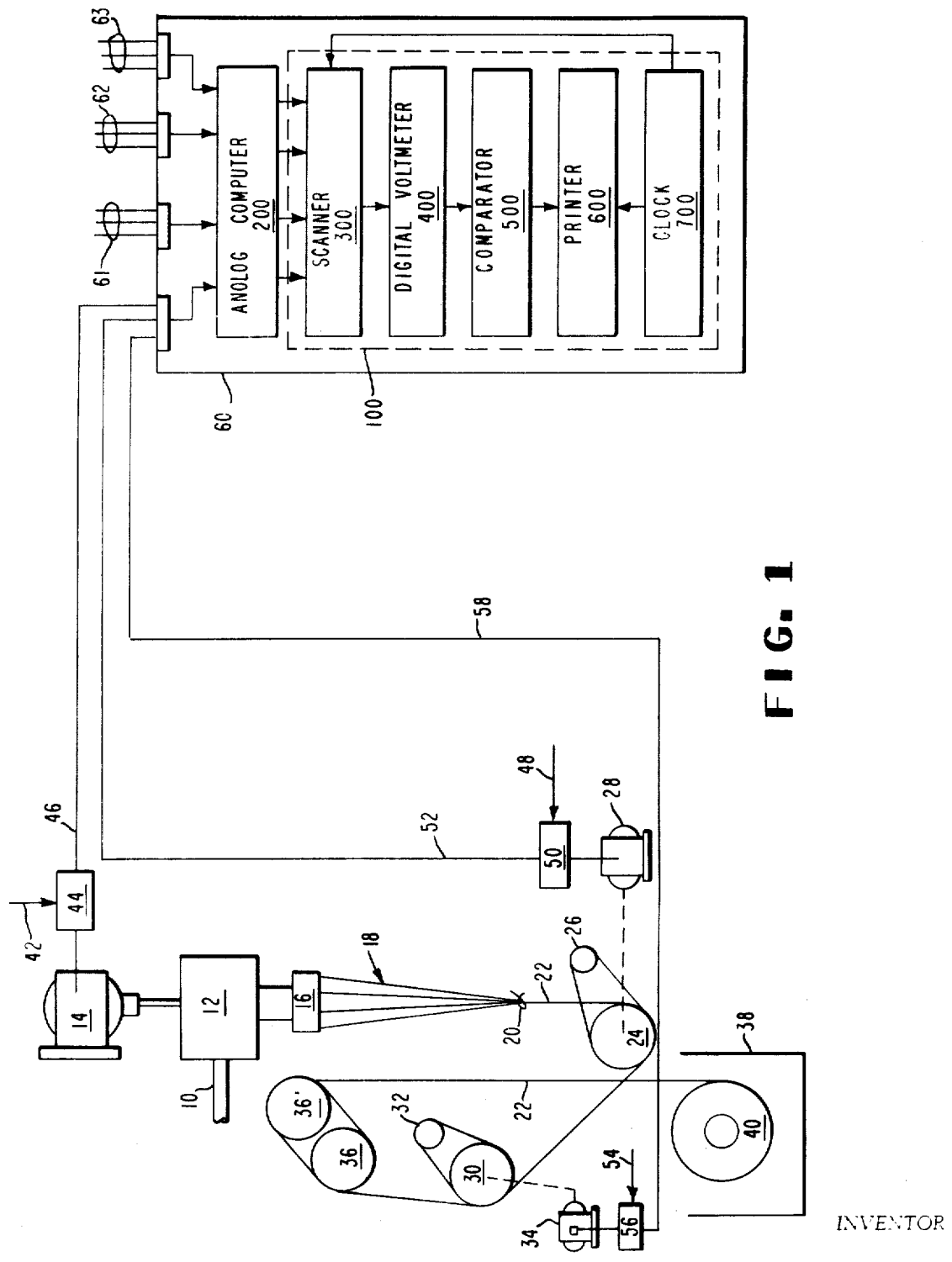
FIG. 1 is a schematic illustration of part of a yarn spinning machine along with a block diagram of the signal analysis system for one embodiment of the invention.

FIG. 1 illustrates a typical spinning process for the production of nylon yarn. Molten polymer from a source (not shown) is supplied over transfer line 10 to meter pump (MP) 12 driven by an electric motor 14. Pump 12 forces polymer through filter and spinneret 16 to form a group of filaments 18 which, after quenching, are gathered by convergence guide 20 into yarn 22. Yarn 22 then is wrapped several times around feed roll (FR) 24 and companion separator roll 26. Roll 24 is driven by electric motor 28 at a predetermined constant speed. Yarn 22 then passes to the initial or first draw (ID) roll 30 and around it and its companion separator roll 32 several times. Electric motor 34 drives roll 30 at constant speed. A second set of draw rolls 36, 36' may be provided for further processing yarn 22. After the final processing step, yarn 22 is wound up on a yarn package 40 in winding machine 38.

Power for electric motor 14 is furnished over cable 42 through wattage transducer 44. The output signal generated by transducer 44 is conducted over cable 46 to signal analysis system 60. Similarly, power for motor 28 is furnished over cable 48 through wattage transducer 50 and generated signal from transducer 50 is sent over cable 52 also to system 60. In a like manner, power to motor 34 over cable 54 through wattage transducer 56 furnishes a generated signal over cable 58 to system 60. In this preferred embodiment the wattage transducers 44, 50 and 56 are of a type employing Hall effect generators to provide electrical signals indicative of the power demand for the respective motors.

In other embodiments additional signals such as those obtained from motors driving draw rolls 36, 36' and/or windup 38 could be added in parallel to cables 46, 52, 58 or substituted for one or more thereof. Groups of signals from parallel spinning positions may be brought into system 60 such as over systems of cables 61, 62, 63.

As shown in the block diagram portion of FIG. 1, the signal analysis system comprises a data acquisition system 100 and an analog computer 200 to be described in detail below by reference to FIG. 2. A scanner 300; a digital voltmeter 400; a comparator 500; a printer 600; and a clock 700 make up the data acquisition system 100. In the preferred embodiment, system 100 is a commercially available electronic instrument, namely, a Hewlett Packard No. 2010K data acquisition system.

Figure 2:
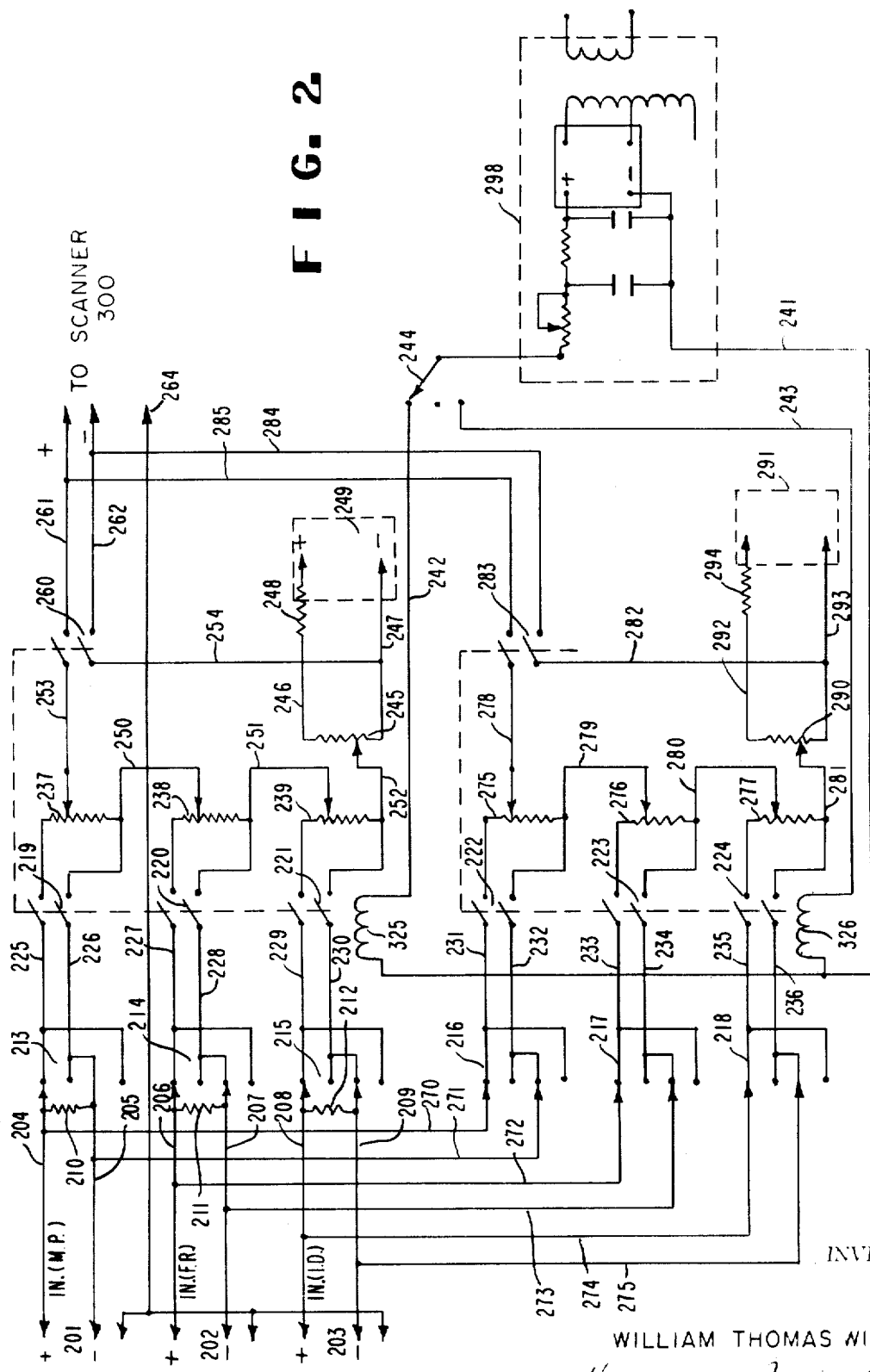
FIG. 2 is a schematic circuit diagram of the computer component of the analysis system.

Turning now to FIG. 2, a schematic circuit diagram of the computer component 200 is shown. For simplicity this diagram covers the circuit for a single position spinning machine. Extension to enable monitoring of multi-position spinning machines is straightforward. Furthermore, the preferred embodiment is arranged to monitor potential dyeability of 66 nylon production for which it has been found possible to predict dyeability on the basis of two indices computed from the following comparatively simple linear equations:

$$D_A = d_{A0} + \sum_{i=1}^{3} d_{Ai} X_i$$

$$D_B = d_{B0} + \sum_{i=1}^{3} d_{Bi} X_i$$

where the eight constants $d_{A0}$, $d_{B0}$, $d_{Ai}$, and $d_{Bi}$ are empirically determined depending on the type of dye sensitivity being monitored. These equations result when the constants are zero for the quadratic and interaction terms ($d_{ii}$ and $d_{ij}$, respectively). For the 66 nylon the $D_A$ index is related to the site concentration sensitive dyeability whereas the $D_B$ relates to structure sensitive dyeability.

As shown in FIG. 2, the three first electric wattage transducer signals from the meter pump (MP), the feed roll (FR) and initial draw roll (ID) Hall effect generators are separately brought into the computer through junction pairs 201, 202 and 203, respectively. Line pairs 204–205, 206–207 and 208–209 bring these three signals to corresponding temperature stabilizing resistors 210, 211 and 212 which are in turn connected to reversing switches 213, 214 and 215. The outputs from these switches are connected through line pairs 225–226, 227–228 and 229–230 through reed relay switches 219, 220 and 221 respectively to coefficient voltage dividing resistors 237, 238 and 239 when relay coil 325 is energized through lines 241 and 242 and switch 244 from power supply 298. A constant DC voltage is supplied to voltage dividing resistor 245 through lines 246, 247 and resistor 248 from power supply 249 which in this embodiment is a standard 15 volt Ferrotran power supply. The sum of the voltages developed across resistors 237, 238, 239 and 245 (i.e. the computer output in the form of second electric signals) is obtained by series connecting line 250, 251, 252, 253, and 254 through reed relay 260 and lines 261 and 262 to the digital voltmeter 400 as shown on FIG. 1 by means of the scanning component 300. Reed relay 260 is also energized by coil 325 and therefore operates simultaneously with reed relay switches 219, 220, and 221. A shield from each input cable is carried through the system by line 264 on through to digital voltmeter 400. Switch 244 is part of scanner 300. In a similar manner input signals from the three wattage transducers are also connected through line pairs 270–271, 272–273 and 274–275 to polarity reversing switches 216, 217 and 218. Signals are brought through reed relays 222, 223, and 224, voltage dividing resistors 275, 276 and 277, series connected lines 278, 279, 280, 281 and 282, reed relay 283, and lines 284 and 285 to lines 262 and 261 respectively, when scanner 300 connects switch 244 to line 243. Then coil 326 is energized through switch 244 and lines 241 and 243 from power supply 298 and closes reed relays 222, 223, 224 and 283. With switch 244 in this latter position, coil 325 is deenergized and relays 219, 220, 221 and 260 are opened.

Thus, there is provided a dual analog computer for two dyeability indices on the basis of the four-term linear equations noted above, wherein the $d_o$ terms are furnished respectively by the adjustable output from power supplies 249 and 291, and the constant multipliers $d_1$, $d_2$ and $d_3$ for the three Hall effect signals are provided by the settings of voltage dividing resistors 237, 238 and 239 for one dyeability index and resistors 275, 276 and 277 for the other dyeability index.

The above described analog computer system has been found very useful in predicting dyeability for one or several positions. It is apparent that for a large, multi-position, installation, the use of a conventional digital computer would be more practicable. Such could be easily programmed to solve the equations described above.

In operation, the Hall effect generator signals from each of the monitored positions are fed into the analog computer 200 where signals are combined and proportioned as determined from previous testing. The output signals generated from each computer are scanned by the electronic scanner 300 and fed, along with yarn package identifying information, to the digital voltmeter 400. Voltmeter 400 converts the computer output to dyeability related numerical output, normalized by dye results so that the various positional electrical outputs can be compared on an equal basis. The digital output from voltmeter 400 is then compared in comparator 500 to preset limits known to produce acceptable dyeability in end use applications. Comparator 500 actuates alarms whenever out-of-limits production is detected. In addition, doffing signals from each position and signals from clock 700 enable coordination with the digital voltmeter signals and consequent identification of specific packages which have been found to be unacceptable. Information showing the predicted dyeability level and package identification are recorded by printer 600.

The system has also been connected by way of telephone line to remote laboratory locations and so has demonstrated the ability to transmit out-of-limits alarm information over considerable distance. An accessory readout (punch tape) has been added to enable direct analysis of the data from the analog computer 200 by another computer when desired.

The preferred embodiment has been described in terms of use of three wattage transducer responses on a spinning machine for production of 66 nylon yarn. It is conceivable that wattage transducers might be placed at different or an increased number of locations along the spinning machine and/or that a more complex computation such as a computation employing a quadratic polynomial having first order interaction terms, might be made if needed, for example, for greater accuracy, for other types of fibers, or for other types of dyeability indices.

All of the embodiments have been illustrated on a spinning machine. The improved method can easily be applied to separate yarn modifying steps when electric power is utilized to modify a yarn property, e.g., draw, heat set, stabilize, etc.

While the illustrated embodiment relates to monitoring the level of potential dyeability of yarn on the basis of numerical indices obtained by mathematical combinations of signals related to power consumption of some steps in the yarn production process, signals related to other specific physical parameters that affect dyeability, such as yarn tension, polymer viscosity and temperature may also be used to supplement or supplant signals related to power consumption in the computation.

It is apparent that many changes and modifications can be made without departing from the spirit of the present invention, which is intended to be limited only by the scope of the appended claims.

What is claimed is:

1. In a process for producing yarn from polymer in a plurality of steps each of which modify a yarn physical property that affects the level of potential dyeability of the yarn, said level being related to a dyeability index, said physical properties being continuously detected, the method of monitoring the level of potential dyeability of the yarn comprising: generating first signals proportional to power levels related to physical properties detected in at least two of said steps; generating second signals having a value proportional to the dyeability index wherein said second signals are related to said first signals in accordance with the following function:

$$D = d_o + \sum_{i=1}^{n} d_i x_i + \sum_{i,j=1}^{n} d_{i,j} x_i x_j + \sum_{i=1}^{n} d_{ii} x_i^2$$

where D represents the second signals $d_o$, $d_i$, $d_{i,j}$ and $d_{ii}$ are empirically determined constants for a preselected polymer and dye type and $x_i$, $x_j$ represent first signals; and detecting when the value of said second signals fall outside predetermined limits.

2. In a process for producing yarn in a plurality of steps each of which utilizes electric power to modify a yarn property that affects the level of potential dyeability of the yarn, said level being related to a dyeability index, the method of monitoring the level of potential dyeability of the yarn comprising: generating first signals proportional to the electric power utilized in at least two of said steps; generating second signals proportional to the dyeability index wherein said second signals are related to said first signals in accordance with an explicit quadratic polynomial function having first-order interaction terms; and detecting when said second signals fall outside predetermined limits.

3. The process as defined in claim 2, said yarn being produced from synthetic polymer.

4. The process as defined in claim 3, said yarn being nylon.

5. The process as defined in claim 2, said first and second signals being electric.

6. The process as defined in claim 2, said second signals being related to said first signals in accordance with the following:

$$D = d_o + \sum_{i=1}^{n} d_i x_i + \sum_{i,j=1}^{n} d_{i,j} x_i x_j + \sum_{i=1}^{n} d_{ii} x_i^2$$

where D represents the second signals $d_o$, $d_i$, $d_{i,j}$ and $d_{ii}$ are empirically determined constants for a preselected polymer and dye type and $x_i$, $x_j$ represent the first signals.

7. In a process for producing nylon in a plurality of steps each of which utilizes electric power to modify a yarn property that affects the level of potential dyeability of the yarn, the method of monitoring the level of potential dyeability of the yarn comprising: generating electric signals proportional to the electric power utilized in at least two of said steps, said electric signals being representations of the magnitudes of the variables in an explicit quadratic polynomial function with first order interaction terms; generating the value of said function for said magnitudes; and detecting when said value falls outside predetermined limits.

8. In a process for producing yarn from synthetic polymer in a plurality of steps each of which utilizes electric power to modify a yarn property that affects the level of potential dyeability of the yarn, the machine implemented method of monitoring the level of potential dyeability of the yarn as it is being produced comprising: generating electric signals proportional to the electric power utilized in at least two of said steps, said electric signals being representations of the magnitudes of the variables in a linear polynomial function; generating the value of said function and detecting when said value falls outside predetermined limits.

9. The process as defined in claim 8, wherein electric signals proportional to the power utilized in three of said steps are generated and the linear polynomial function is expressed by the following:

$$D = d_o + \sum_{i=1}^{3} d_i X_i$$

where D is the level of potential dyeability of the yarn, $d_o$, $d_i$ are empirically determined constants for a preselected dye type and $X_i$ represent the electric signals.

10. In the production of yarn in the plurality of steps each of which utilizes electric power to modify a yarn property that affects the level of potential dyeability of the yarn, the system for monitoring the level of potential dyeability of the yarn comprising: means for generating electric signals proportional to the electric power utilized in at least two of said steps, said electric signals being representations of the magnitudes of the variables in a linear polynomial function; means for generating the value of said function for said magnitudes; and means for determining when said value falls outside predetermined limits.

11. The apparatus as defined in claim 10, wherein said means for generating said value is a digital computer.

12. The apparatus as defined in claim 10, wherein said means for generating said signals is a wattage transducer.

13. In the production of yarn in a plurality of steps each of which utilizes electric power to modify a yarn property that affects the level of potential dyeability of the yarn, said level being related to a dyeability index, the system for monitoring the level of potential dyeability of the yarn comprising: means for generating first signals proportional to the electric power utilized in at least two of said steps; means for generating second signals proportional to dyeability wherein said second signals are related to said first signals in accordance with an explicit quadratic polynomial function having first-order interaction terms and means for determining when said second signals fall outside predetermined limits.

14. In the production of yarn in the plurality of steps each of which utilizes electric power to modify a yarn property that affects the level of potential dyeability of the yarn, the system for monitoring the level of potential dyeability of the yarn comprising: means for generating electric signals proportional to the electric power utilized in at least two of said steps, said electric signals being representations of the magnitudes of the variables in a linear polynomial function; an analog computer for generating the value of said function for said magnitudes; and means for determining when said value falls outside predetermined limits.

* * * * *